Patented May 28, 1946

2,401,138

UNITED STATES PATENT OFFICE 2,401,138

RESIN BONDED ABRASIVES

Loring Coes, Jr., Brookfield, Mass., assignor to Norton Company, Worcester, Mass., a corporation of Massachusetts No Drawing. Original application March 20, 1943, Serial No. 479,903. Divided and this application June 26, 1943, Serial No. 492,415

31 Claims. (Cl. 51—298)

This invention relates to grinding wheels and other solid abrasive compositions and relates also to resins and resinous compositions of the phenol formaldehyde type; more particularly, this invention relates to abrasive articles of the kind just mentioned that are bonded with organic or resin bonds, especially the polymerized condensation product of phenol with an aldehyde, and also to resins of the just-mentioned kind and their compositions and treatment.

This application is a division of my application, Serial No. 479,903 filed March 20, 1943.

One of the objects of this invention is to provide a superior plasticizer for abrasive grains for the manufacture of abrasive compositions of the above-mentioned type and, more particularly, to improve the characteristics, both during processing and in the final abrasive product, of resins of the just-mentioned kind. Another object is to facilitate, expedite and simplify the making of abrasive articles utilizing resins of the abovementioned kind.

Another object is to provide an abrasive wheel or other abrasive article utilizing a phenol-aldehyde bond, that will be capable of producing a chemical reaction with the work operated upon and thereby improve the abrading action. More particularly, another object is to provide a grinding wheel or other abrasive article of the justmentioned kind in which a halide, such as hydrogen chloride, can be made available at the grinding line, for improving grinding action.

Another object is to provide a grinding wheel or other abrasive body, utilizing phenol aldehyde resin as a bond, that will not, during the process of compounding and treatment for making it, react to form water and thus cause blistering, bloating or the like. Another object is to provide a method and treatment for effecting, without the detrimental formation of water, dependable bonding by phenol formaldehyde resin of abrasive grains to produce abrasive wheels or other abrasive articles. Another object is to provide a mixing plasticizer and hardening agent for the phenol aldehyde resin of mixes comprising abrasive grains and such resin for the making of grinding wheels and other abrasive articles.

Another object is to improve the working and curing characteristics of phenol aldehyde resins and to avoid certain shortcomings of such resin as heretofore known and used. Another object is to provide a method of treatment and curing of phenol aldehyde resin that will for practical purposes avoid the formation of water or water vapor and detrimental actions caused thereby such as blistering, bloating, swelling or the like. Another object is to provide a plasticizing and hardening agent for phenol aldehyde resin that will not react therewith to form water. Another object is to provide a plasticizer and hardening agent for phenol aldehyde resin that will give the resultant mix improved characteristics as to handling or workability or method of moulding or shaping and curing of the resinous composition.

Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

Grinding wheels and other abrasive products have heretofore been made by using phenol aldehyde resins together with a plasticizer or hardening agent, usually furfural, usually by making a mix of these ingredients and of abrasive grain, thus forming what is known as a "dry granular mix," then cold-pressing and heat-treating in an oven, or by so-called hot-pressing in which the dry mix is molded and pressed in a heated mold and cured; in either case, molds are required for the various shapes and sizes of product to be made, these molds are usually constructed for use in hydraulic presses or the like, and hence involve substantial and expensive equipment, and in the hot-pressing method costly equipment like hydraulic presses is tied up for substantial lengths of time. Generally similar disadvantages are present in certain heretofore known or now practiced methods of molding objects or articles out of phenol aldehyde resins, usually with some sort of filler or fillers, or without a filler. One reason why such disadvantages are present in such and other methods of molding products utilizing phenol aldehyde resins is that the plasticizer or hardening agent employed, such as furfural, commences a substantially immediate reaction with the resin which is usually employed in powdered form so that the mix undergoes what might be termed a preliminary setting though still requiring an ultimate heat treatment to effect final curing; as a result of this preliminary setting, various limitations are necessarily imposed upon the handling or processing and the field of application of such resins substantially correspondingly restricted. One of the dominant aims of this invention is to overcome such disadvantages and limitations and to enlarge the field of use of such phenol resins.

The practicing of my invention, in its various aspects and also to give certain specific illustrations of certain of its advantages, will be understood by considering the making of an abrasive composition, such as a grinding wheel. Accordingly, I start with a suitable quantity of abrasive grain of any suitable kind. Thus I may employ any of the varieties of alumina, such as emery, corundum, dense "regular" fused alumina, porous white fused alumina; silicon carbide and other hard carbides; quartz; glass; garnet; or diamonds. These are illustrations and, of course, two or more of these abrasives may be mixed, if desired. Such abrasive grain is to be bonded to form, for example, a grinding wheel.

If, now, I were to employ a phenolic resin according to known practices, using, for example, furfural as a grain-wetting and resin plasticizing or hardening agent, the resultant so-called granular mix begins to set and has to be reasonably promptly molded and cured, as by hot-pressing as above noted or as by cold-pressing as above described, requiring relatively costly equipment and frequently tying such equipment up for substantial lengths of time; such a mix, moreover, cannot be worked on mill rolls, because it is too sticky and because hardening or setting commences or proceeds. Also, because of such disadvantageous characteristics, phenolic resins or mixes, usually with some sort of filler, when employed for the making of products other than abrasive articles, impose limitations upon the manner of handling them in the uncured state; for example, being sticky and subject to progressive hardening when in the plastic or doughy state, they do not lend themselves for so-called injection molding.

However, according to my invention, I am enabled to overcome such disadvantages and in effect enlarge the field of uses or applications of phenolic resins or simplify and make less expensive their uses in certain fields, or both. I have discovered how to avoid the above-mentioned undesirable stickiness and progressive hardening and how to make up an uncured plastic phenolic resin mix that does not have detrimental tackiness or stickiness and that is capable of retaining the desirable quality of plasticity or flow-ability and thus permit use of quite different and more advantageous methods of working, molding, shaping or the like, for subsequent heat treatment or subsequent curing.

My invention is applicable to the phenol aldehyde resins and, for purposes of illustration, I will describe it in connection with phenol formaldehyde resin.

In carrying out my invention and as I now understand it, I make available, for cross-linking during polymerization under subsequent heat treatment, nitrogen atoms in the resin polymer molecule and to which the plasticizing or hardening agent, of a kind heretofore not employed in connection with phenolic resins, can link or attach itself, to form an adequately cross-linked polymer which is a hardened, tough resin body. With such a hardening agent and with a phenolic resin compounded with, or supplemented by, ingredients or compositions so that an amino group or a nitrogen atom is not available for such attachment or cross-linking to or with the hardening agent until a sufficiently high temperature above room or working temperatures is achieved (as in subsequent baking), the progressive hardening at room or working temperatures inherent in known methods of molding phenolic resin products therefore does not or cannot take place or takes place at room or working temperatures only at such a low rate as will still permit achievement of the advantages and benefits of my invention.

There is a goodly number of ways in which I can aminate a phenolic resin, thus to make available an amino group or nitrogen atom for subsequent cross-linking with a hardening agent of the above-mentioned kind. For example, I may react phenol and formaldehyde and ammonia ($NH_3$), and the resultant potentially reactive resin would be suitable to function according to my invention; the ultimate or end product can be made to be fusible or permanently infusible according, as is known, to the proportion of phenol and formaldehyde initially employed. In such a condensation reaction, the ammonia acts primarily as a catalyst but it also acts as an aminating agent, bringing into the resin molecule polymer an amino or nitrogen atom group.

A preferred manner of providing the nitrogen atoms for ultimate cross-linking or co-polymerization with a hardening agent of the above-mentioned character to form a hard resinous body is to employ, in powdered form, an admixture of potentially reactive phenolic resin, such as phenol formaldehyde, and hexamethylenetetramine, hereinafter referred to simply as "hexa"; such an admixture is sometimes regarded as a solid solution of the hexa in the resin and is, moreover, available on the market under the designation "Bakelite BR 2417," a product of Bakelite Corporation. In producing such potentially reactive resin, the hexa is mixed with the phenol formaldehyde, the mixture is melted and, after cooling, the resultant solidified mass is broken up and powdered for use. In such powdered form, the hexa is in solution in the resin and is available for aminating the resin during subsequent heat-treatment during which, also, the hardening agent employed according to my process cross-links with the aminated resin at the nitrogen groups thereof.

Or, depending, for example, upon the characteristics desired in the end product, I may react phenol and formaldehyde and ammonia in the manner above described and to the resultant potentially reactive resin, preferably in powdered form, I add a suitable quantity of hexa, also in powdered form; the former is aminated during the condensation or reaction in the presence of ammonia and the latter can function as an aminating agent during the subsequent heat treatment of the resultant mix in admixture with the hardening agent.

Amination of the phenolic resin may also be effected by adding a suitable quantity of aniline to the phenol and then reacting with formaldehyde in the presence of a catalyst which may be sodium hydroxide, calcium hydroxide, or, by way of further example, ammonia.

Or I may react phenol and formaldehyde in the presence of an aliphatic amine (in place of the ammonia in the first above-described illustration), and any suitable aliphatic amine may be employed, such as methyl amine, ethyl amine, propyl amine, etc.

Amination of the resin may thus be effected prior to or during final heat-treatment or, in point of time, the one may supplement the other, as in the case of the third above-described example; unless otherwise qualified, therefore, the terms "aminate" or "aminating" or "aminated" as used in the claims are intended to be generic and without regard to the specific time, stage, or step in which amination of the resin polymer molecule takes place.

In making up an abrasive product, the desired quantity of abrasive grain and a suitable quantity of the resin in powdered form, such as the above-mentioned phenolic resin, such as, phenol formaldehyde resin, treated with hexa, for example, the above-mentioned BR 2417, and a plasticizer and hardening agent, preferably in liquid form, of a kind capable of attachment to or cross-linking at the nitrogen atoms of the resin polymer molecule, and with or without other substances, such as fillers or the like, are mixed together in any suitable way. As an illustration of such a plasticizing and hardening agent, I may employ tri-glycol dichloride; numerous others are mentioned later hereinafter. I have found that a wide and advantageous selection is available.

For example, I may treat the liquid hardening agent as a grain-wetting agent, thus first wetting the surfaces of the grains, and then adding the powdered resin, the pre-wetting of the grains insuring in the ensuing mixing operation that the particles of the powdered resin adhere to and cover over the surfaces of the grains. In this manner, with other ingredients added and intermixed therewith, such as fillers, dehydrating agents, dehalogenating agents or the like, as may be desired, a so-called dry granular mix results. This mix is free from the above-mentioned detrimental rate of hardening at room or working temperatures, and it may be shaped or molded in any desired way without having to have regard for progressive hardening, and it may subsequently be heat-treated in any suitable way as by baking in an oven, curing at suitable temperature in a mold, if desired, etc. For purposes of shaping or handling before or after shaping, the material is non-sticky.

But more advantageously, such a dry granular mix, because it is for practical purposes non-hardening at room or working temperatures and because it does not have detrimental tackiness, can be worked up on mill rolls, passing it through the mill rolls to effect or complete the mixing thereof and during working up on such mill rolls other ingredients, such as fillers, etc., may be added progressively or in any desired manner and thereafter, depending upon the ultimate product, the plastic mass may be sheeted out in calendar rolls to the desired thickness and with the desired compactness. Insofar as I am aware, it has heretofore been impossible to so treat a phenolic resin mix, whether or not it contained abrasive grain, the stickiness and progressive hardening noted above precluding such treatment.

When sheeted out, the desired configuration of ultimate article desired is cut out of the sheet and in the case of making grinding wheels and hence where the sheeted material contains abrasive grain, disks are cut out of the sheet, the disks retaining, of course, the thickness of the sheet itself. Thus cut out of the sheet, the articles can be easily handled and may then be heat-treated in an oven, in large quantities, care being taken that each article when put in the oven rests upon a suitable flat surface to avoid distortion and to avoid curing it in distorted form. Particularly when making relatively thin grinding wheels, this method of working up on mill rolls, calendering into sheet form and cutting out of the disks has numerous advantages of which it is sufficient to note the simplicity and inexpensiveness of equipment needed, the avoidance of tying up of expensive equipment such as the presses in the hot-pressing method, and the possibility of curing continuously or in large groups simultaneously of numerous articles or products.

Moreover, I am enabled to achieve numerous other advantages. For example, it is not necessary, though it may be desirable or preferred according to circumstances, first to wet the abrasive grains; thus the mix may be made up initially without the abrasive grains, for example, by mixing the powdered resin with the liquid plasticizer or hardening agent, in any suitable mixer. The resultant dough-like or plastic mass can then be transferred to mill rolls further to work it up or to complete the mixing of its ingredients, and while working it on the mill rolls other ingredients such as those mentioned above, and even also the abrasive grain (which can be in dry condition) can be added and worked into the mass. Pre-wetting of the grain, in the case of making abrasive articles, need not be resorted to since, in adding the grain to the mass while it is being worked up on the mill rolls, the latter and the resultant working up of the mass insure that there is such complete and uniform distribution of the grain throughout the mass and engagement of the grain surfaces with the material of the mass as will, in the end result or end product, produce uniform and good bonding together of the grain.

When sheeting out the plastic mass, as by the above-mentioned calender rolls, and thereafter cutting out the desired configuration of articles, such as disks for grinding wheels or other shapes of abrasive body, or any other desired shape or configuration when the mass does not include abrasive grain, a certain amount of the sheeted material is left over, as, for example, the regions intermediate of adjacent or successive disks when cutting out grinding wheels, but here it is to be noted that such left-over material is not "scrap" or waste material, but, because it is not undergoing progressive hardening to any detrimental extent, the left-over material, even though in pieces of various sizes, can simply be gathered together and fed to the mill rolls to be by them worked up into a unitary mass, which continues its plasticity or quality of flowability. It may then again be calendered to sheet it out and thus again to have articles cut out of it for subsequent baking or curing. Left-over material may again be reworked or added to a new batch or mix on the mill rolls. Thus wastage as would result if the phenolic resin mix underwent progressive hardening, as with heretofore known phenolic resin compositions, can be avoided, even assuming that the stickiness or tackiness of such prior phenolic resin mixes, otherwise precluding working on mill rolls and calender rolls, could be eliminated or avoided.

Moreover, also, the potentially reactive phenolic resin mix of my invention, particularly in the making of non-abrasive resinous articles, lends itself to so-called injection molding because, not being detrimentally sticky and retaining its quality of mobility or flowability, it can be, under pressure or in any other suitable way, charged or flowed into mold cavities of desired configuration, thus to be given the shape or conformation of the ultimate product desired, whence it may be removed from the mold cavities and the molded forms or bodies subjected to appropriate heat treatment, as in an oven, to effect cross-linking and hence polymerization into hardened form or condition. Depending upon the proportion of phenol and formaldehyde initially employed, the resultant product is fusible under the application of heat, or is a thermo-irreversible body, as will now be clear in view of the above. Thus it will be seen that the production of phenolic resin products can be more efficiently and less expensively effected; for example, heat treatment or curing in the mold, requiring a time element, can be eliminated, molding apparatus can be simpler and less expensive in that the features of heating need not be employed, and the tying up of expensive equipment, such as is used in heat and pressure molding, can be avoided.

As pointed out hereinafter, I am enabled furthermore to achieve other advantages.

Considering more in detail the reactions that take place, let it again be considered that the above-described phenolic formaldehyde resin with hexa and tri-glycol dichloride are employed. The presence of the nitrogen atom in the potentially reactive phenol formaldehyde resin is due to the fact that the reaction of the resin (phenol formaldehyde in the above-assumed illustration) and the hexa produces some groups of the following type, hereinafter called, for convenience, Group A:

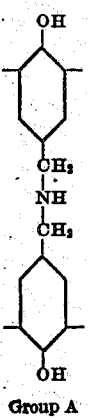

Group A

In the above, note the NH or nitrogen atom group, available for cross-linking.

Tri-glycol dichloride is written thus:

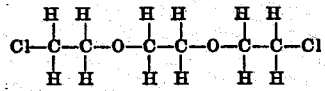

At ordinary or room temperatures or the temperatures that exist during making up of a mix or in working it on mill rolls, calender rolls or the like, the tri-glycol dichloride and the phenol formaldehyde resin polymer alkylated by the hexa so that a nitrogen atom is introduced into the resin polymer molecule as above explained and as appears from the above Group A or chain above depicted, there is no reaction between the two, that is, no substantial or material cross-linking between the two takes place, and hence the above-described state of plasticity or condition of flowability is retained. But when subjected to heat treatment, as in an oven, and illustrations of which are set forth hereinafter, the reaction between the two sets in and a highly cross-linked structure and hard, tough resinous product result. Such cross-linking forms groups of the following type:

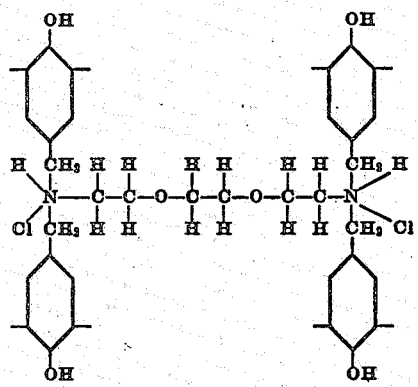

It will be noted that the plasticizing or hardening agent cross-links with "A" groups at the amino groups of the latter, specifically at the NH or N atom groups, and without the provision of the latter, the tri-glycol dichloride would not function as it does as a plasticizing or hardening agent. It will thus be noted that the phenol formaldehyde resin, in being thus provided with a nitrogen atom or atoms in its continuous chain groups, is thus prepared or conditioned structurally, in a chemical sense, for reaction and cross-linking with the tri-glycol dichloride and that such preparation can be effected as well as final cross-linking with the tri-glycol dichloride, not only without detracting from the ultimate desirable qualities of the hardened resin, but also with the achievement of new characteristics, such as absence of detrimental stickiness, maintenance of plasticity or flowability before final heat treatment, and the like.

Moreover, it will also be noted that the tri-glycol dichloride has functioned as a halogenating agent, H and Cl appearing in the groups of the cross-linked polymer at the amino groups thereof. This is advantageous when making abrasive products, such as grinding wheels, for the heat generated at the grinding line causes the release from the structure of hydrogen chloride, thus coacting to achieve improved or better grinding action.

Numerous other substances may be employed, besides tri-glycol dichloride. Thus I may use dichlor diethyl ether; other poly-glycol dichlorides may also be used, for example, tetra-glycol dichloride, or penta-polyglycol dichloride, and of course, mixtures of two or more may also be employed. Compounds of large molecular weight, that is, having additional $C_2H_4$ groups, are solids and, without more, cannot take part in making up a plastic or flowable mass and hence I prefer not to use them.

Other cross-linking agents that may be employed, and there are many, include di-monochloracetates of ethylene glycol, poly-ethylene glycol, substituted poly-ethylene glycols and tri-methylene glycol; di-monochloracetate of ethylene glycol is:

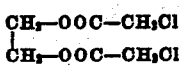

Cross-linking with the nitrogen-atom containing phenolic resin, containing the above-mentioned groups "A," again takes place at the nitrogen atoms of the resin polymer molecule and again halogenation takes place in that H and Cl appear in the groups of the cross-linked polymer at the amino groups thereof, in substantially the following way which illustrates, with respect to di-monochloracetate of ethylene glycol how the other above-mentioned agents also cross-link:

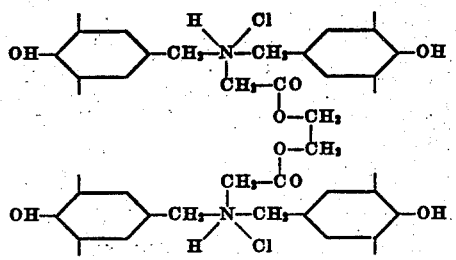

The just-mentioned substances might all be called glycol di-monochloracetates and of the latter, I prefer to use any glycol di-monochloracetate selected from the group consisting of ethylene glycol di-monochloracetate, di-ethylene glycol di-monochloracetate, tri-ethylene glycol di-monochloracetate, and tri-methylene glycol di-monochloracetate.

Still other substances usuable in the above manner may comprise tri-monochloracetates of certain trihydric alcohols, more particularly in the use of glycerol tri-monochloracetate or tri-methylol propanetri-monochloracetate, or mixtures thereof. Glycerol tri-monochloracetate is written thus:

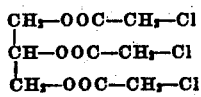

The latter may be used to illustrate the cross-linking of ingredients of the above-mentioned group, substantially as follows:

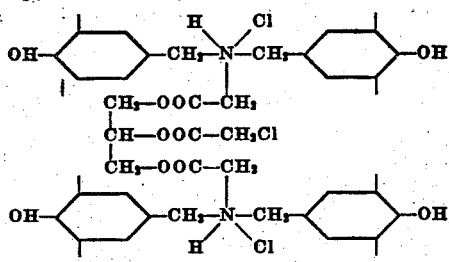

Also, I may use esters of ethylene chlorhydrins with polybasic acid; thus, I may use, di-2chlorethyl phthalate; this ester is:

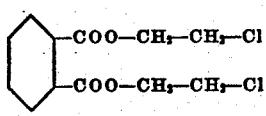

Or I may use di-2chlorethyl maleate; this ester is:

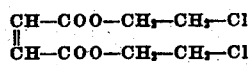

Or I may use di-2chlorethyl succinate; this ester is:

$$CH_2-COO-CH_2-CH_2-Cl$$
$$CH_2-COO-CH_2-Cl$$

The cross-linking may be set out substantially as follows:

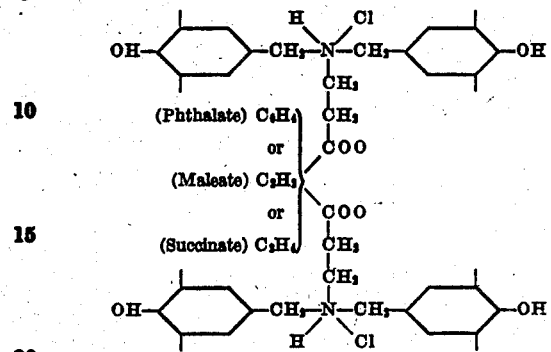

Other usable esters comprise chloracetates of glycerol chlor-hydrins or mixtures thereof and conveniently a mixture is employed; for example, I may start with glycerol $\alpha\gamma$ dichlorhydrin and glycerol $\alpha\beta$ dichlor-hydrin, which are, respectively, or may be written thus:

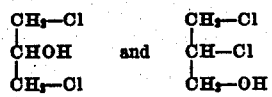

Mixtures of the above form chloracetates when reacted with chloracetic acid; such chloracetates are, respectively, or may be written thus:

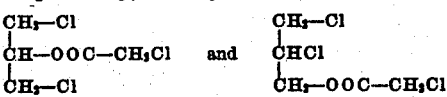

Cross-linking of the mixture with the nitrogen-bearing phenol formaldehyde resin is substantially like this:

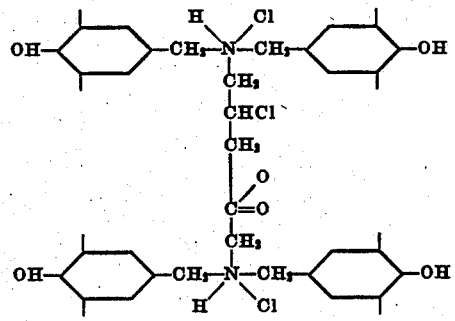

Thus it will be seen that there are numerous compositions that can be employed; these agents are all plasticizers or hardening agents, they are cross-linking agents and, moreover, will be seen to have the characteristic that their attachment is at the nitrogen atom or nitrogen group with which the resin polymer molecule has been provided by alkylation of the phenol formaldehyde resin; they are all halides and thus are well suited to cross-linking at or attachment to the nitrogen atom group in the resin polymer molecule. They also halogenate the resin which is the end product and this is of advantage in the making of abrasive articles in that the grinding action, due to the release, in the above illustrations, of hydrogen chloride, is improved. In each case, the H and Cl appears attached at the nitrogen atom group. Naturally enough, the examples above set forth are chlorinated compounds because these are cheaper and more readily available or producible than other halogenated compounds, such as the brominated or iodated, but halogenated compounds other than the chlorinated will give effective results and the setting forth of such chlorinated compounds as the above is not to be interpreted by way of limitation.

Examples of the compounding, treatment or method of making resinous products according to my invention are set forth below, illustratively in connection with the making of grinding wheels, and in the latter particularly numerous practical advantages are achieved; the following examples are set forth with respect to only a few of the above-mentioned usable agents.

*Example I*

550 grams of No. 46 grit "Alundum" abrasive grain and 230 grams of a mixture comprising, by volume 65% of BR 2417 resin, 30% of iron pyrite, and 5% of calcium oxide, all in powdered form, are mixed together with 20 cc. of tri-glycol dichloride. As will be clear from what is set forth above, there is wide flexibility in the manner in which these substances are brought together. Thus the grain can first be wet with the tri-glycol dichloride and then the mixture added thereto, and all preliminarily mixed in any suitable form of mixer, to form a plastic mass which may then be worked on differential mill rolls and then sheeted out as by calender rolls. Or the above mixture of hexa resin, iron pyrite and calcium oxide may be mixed with the tri-glycol dichloride, as in a suitable mixer, to form a plastic mass to which the abrasive grain may thereafter be added as, for example, while working the plastic mass up on the mill rolls, thus to thoroughly distribute the grain throughout the mass as well as to complete the mixing of the other ingredients thereof, and then sheeting out in calender rolls. These are but two illustrations of available flexibility of procedure at this stage; a similar flexibility, it will be understood, is available with respect to the other examples set out hereinafter.

In a specific illustration, this plastic mass which, it will be seen, could also be in the form of a granular mix where the mix is first made up with abrasive grain, as in a rotary "Hudson" type of mixer, was worked on mixing rolls, such as differential mill rolls, with the rolls cold or at or about room temperature, and on such rolls the resultant sheet-like mass, still plastic, was rolled down in calender rolls to the desired thickness, in this illustration $\frac{3}{4}$ of an inch. From the resultant sheet a disk of 12 inches in diameter with a 1 inch hole was cut, that being the form, shape and dimensions desired in the final product, and it may in this instance be termed a "green" wheel.

The green wheel was put on a "batt", that is, a suitably rigid sheet material on which it rests flatwise and by which it is held by its own weight against distortion out of a straight or flat plane, and as so supported, is put in an oven and baked to cure the resin and to bring about the crosslinking such as that above described. In this example, the baking proceeded in successive stages of 4 hours at 130° C. and 4 hours at 175° C.

The resultant grinding wheel had a porosity of 7% and was 50% abrasive by volume. Its grinding performance was good; it was tested at 10,500 surface feet per minute upon ½ inch cold rolled steel rod and showed a diametrical wheel wear of 6.7 mils per cut.

*Example II*

2,000 grams of No. 46 grit "Alundum" abrasive grain was wet with 100 cc. of di-ethylene glycol chloracetate and then there was added 800 grams of a mixture consisting, by volume, of 65% of phenol formaldehyde resin containing 8%, by weight, of hexa (being in effect BR 2417 resin), 30% of iron pyrite and 5% of anhydrous calcium sulphate, all in powdered form. Mixing was carried on in a rotary Hudson type of mixer until a so-called dry granular mix resulted.

The dry granular mix or mass was then worked on cold differential mixing rolls into a solid sheet-like mass which was then rolled down in calender rolls to a thickness of $\frac{3}{4}$ of an inch, whereupon a disk of 12" diameter with a 1" central hole was cut from the sheet, giving a green wheel.

The green wheel was put on a batt and so supported was baked in an oven at suitable temperature and, in this instance, was baked for 3 hours at 100° C.; then 3 hours at 125° C., then 3 hours at 155° C., followed by 4 hours at 175° C.

The finished wheel was then tested in wet and dry grinding on a cut-off machine, operating upon ½ inch cold rolled steel rod, running at 10,500 S. F. P. M. The average diametrical wheel wear, per cut, for 80 dry cuts was 4.8 mils.

*Example III*

2,000 grams of No. 46 grit "Alundum" abrasive grain was wet with 100 cc. of glycerol chlorhydrin chloracetate and then there was added 800 grams of a mixture consisting, by volume, of 65% of phenol formaldehyde resin containing 8%, by weight, of hexa (being in effect BR 2417 resin), 30% of iron pyrite and 5% of anhydrous calcium sulphate, all in powdered form. Mixing was carried on in a rotary Hudson type of mixer until a so-called dry granular mix resulted.

The dry granular mix or mass was then worked on cold differential mixing rolls into a solid sheet-like mass which was then rolled down in calender rolls to a thickness of $\frac{3}{4}$ of an inch, whereupon a disk of 12" diameter with a 1" central hole was cut from the sheet, giving a green wheel.

The green wheel was put on a batt and so supported was baked in an oven at suitable temperature and, in this instance, was baked for 3 hours at 100° C., then 3 hours at 125° C., then 3 hours at 155° C., followed by 4 hours at 175° C.

The finished wheel was then tested in wet and dry grinding on a cut-off machine, operating upon ½ inch cold rolled steel rod, running at 10,500 S. F. P. M. The average diametrical wheel wear, per cut, for 80 dry cuts was 6.0 mils.

*Example IV*

2,000 grams of No. 46 grit "Alundum" abrasive grain was wet with 100 cc. of dichlor ethyl phthalate and then there was added 800 grams of a mixture consisting, by volume, of 65% of phenol formaldehyde resin containing 8%, by weight, of hexa (being in effect BR 2417 resin), 30% of iron pyrite and 5% of anhydrous calcium sulphate, all in powdered form. Mixing was carried on in a rotary Hudson type of mixer until a so-called dry granular mix resulted.

The dry granular mix or mass was then worked on cold differential mixing rolls into a solid sheet-like mass which was then rolled down in calender rolls to a thickness of $\frac{3}{4}$ of an inch, whereupon a disk of 12" diameter with a 1" central hole was cut from the sheet, giving a green wheel.

The green wheel was put on a batt and so supported was baked in an oven at suitable temperature and, in this instance, was baked for 3 hours at 100° C., then 3 hours at 125° C., then 3 hours at 155° C., followed by 4 hours at 175° C.

The finished wheel was then tested in wet and dry grinding on a cut-off machine, operating upon ½ inch cold rolled steel rod, running at 10,500 S. F. P. M. The average diametrical wheel wear, per cut, for 80 dry cuts was 6.3 mils.

In all of the above illustrations, I have described my invention in connection with phenol formaldehyde, but I do not thereby intend to limit my invention to that particular type of phenolic resins; thus I may use, and my invention is equally applicable to, such other phenol aldehyde resins, such as phenol furfural, cresol formaldehyde, and cresol furfural, as react, in a manner substantially the same as is above set forth with respect to phenol formaldehyde which has been selected for illustrative purposes, in the processing above described, and the term "phenolic resin" as used in the claims is intended to include not only phenol formaldehyde but also its equivalents, such as the just mentioned other phenol aldehyde resins.

I have in the above also pointed out how the hardening agents I employ function also as halogenating agents and how, in the specific illustrations set forth, they react with the nitrogen-atom containing phenolic resins to provide H and Cl that is releasable, during the action and heat of grinding, as hydrogen chloride to improve the grinding action. I might note at this point that, where and if desired, compounds or compositions may be added to such mixes as those above described in order also or further to halogenate the cross-linked resin polymer and among such additional halogenating agents that may be employed I may use any of polyvinyl chloride, polyvinylidene dichloride, rubber hydrochloride, chlorinated rubber, chlorinated polyisobutylene; any chlorine, bromine or iodine substituted paraffine hydrocrabon, such as hexa chlor ethane, tetra chlor pentane, 1,2,diiodo ethane, beta butylene bromide, partly chlorinated eicosane, or any aliphatic halohydrin of not more than six carbon atoms, such as any of the amylene chlorhydrins; propylene chlorhydrin; any of the butylene chlorhydrins; ethylene chlorhydrin, ethylene bromhydrin, or glycerol alpha gamma dichlorhydrin. The just-named examples happen to be chlorinated compounds because these are cheaper and more readily producible or available than other such halogenated organic compounds, such as the brominated or iodated compounds, which give effective results in bringing or making available at the grinding line acids corresponding to hydrogen chloride; it will be understood, however, that the use of such additional halogenated organic compounds is not a necessary part or step in my invention and is hence optional, and is set forth to show that, if desired, their advantages may be gained without impairment of the functioning of my invention.

Numerous advantages of my invention have been pointed out above, but there are others. For example, phenolic resins as heretofore compounded, treated or cured, are accompanied by the formation of water, causing disadvantages or difficulties, such as bloating or swelling, caused probably also by water vapor pressures created internally of the curing mass. But when compounded, treated or cured according to my invention, no water is formed and hence such disadvantages and difficulties of defects as have just been pointed out can be avoided, and it is also possible to avoid having to resort to expedients of dehydration. Gas formation or evolution during curing has also given troubles or difficulties according to prior compounding, treatment and curing of phenolic resins but in practicing my invention I have found no material or harmful gas effects even though it is possible that small quantities of $NH_3$ can be formed due to the hexa ingredient, but that does not appear to cause any appreciable swelling.

It will thus be seen that there has been provided in this invention phenolic resinous compositions and a method of achieving them and abrasive articles and a method of making them in which the various objects hereinbefore noted together with many thoroughly practical advantages are successfully achieved. Though I have set forth in the foregoing specific illustrations pertaining to the making of abrasive articles, the practicing of my invention with respect to the phenolic resins per se will also be now clear and fully understood.

As many possible embodiments may be made of the mechanical features of the above invention and as the art herein described might be varied in various parts all without departing from the scope of the invention, it is to be understood that all matter hereinabove set forth is to be interpreted as illustrative and not in a limiting sense.

I claim:

1. An abrasive article comprising abrasive particles bonded by a bond that comprises the substantially water-free and substantially unswelled reaction product of an aminated phenolic resin and a resin-hardening resin-solvent agent that is a halide and therefore capable of reaction with the resin polymer at the amino groups thereof, said halide agent being, in said reaction product, cross-linked with the resin polymer molecules at the amino groups thereof.

2. An abrasive article comprising abrasive particles bonded by a bond that comprises the heat-cured substantially water-free and substantially unswelled reaction product of potentially reactive phenolic resin, an aminating agent therefor for reaction therewith to provide amino groups in the polymer molecules of the resin, and a resin-hardening resin-solvent agent that is a halide and therefore capable of reaction with the resin polymer at the amino groups thereof, said halide agent being, in said reaction product, cross-linked with the resin polymer molecules at the amino groups thereof.

3. An abrasive article comprising abrasive particles bonded by a bond that comprises the substantially water-free and substantially unswelled reaction product of potentially reactive initially aminated phenolic resin and a resin-hardening resin-solvent agent that is a halide and therefore capable of reaction with the resin polymer at the amino groups thereof, said halide agent being, in said reaction product, cross-linked with the phenolic polymer molecules at the amino groups thereof whereby production of $H_2O$ along with, or as part of, said reaction product is substantially prevented.

4. An abrasive article comprising abrasive particles bonded by a bond that comprises the substantially water-free and substantially unswelled reaction product of initially aminated phenolic resin, an aminating agent for reaction therewith to provide amino groups in the polymer molecules of the resin, and a cross-linking resin-hardening resin-solvent agent that is a halide and therefore capable of reaction with the resin polymer at the amino groups thereof, said halide agent being, in said reaction product, cross-linked with the resin polymer molecules at the amino groups thereof.

5. An abrasive article comprising abrasive particles bonded by a bond that comprises the substantially water-free halogenated reaction product of an aminated phenolic resin and a cross-linking resin-hardening resin-solvent agent that has the characteristic of reacting with the resin polymer at the amino groups thereof and without detrimental production of water of formation and being, in said reaction product, cross-linked with the resin polymer molecules at the amino groups thereof.

6. An abrasive article comprising abrasive particles bonded by a bond that comprises the reaction product of a mix that includes an aminated phenolic resin, a halide, and a resin-hardening resin-solvent agent that has the characteristic of reacting with the resin polymer at the amino groups thereof and without detrimental production of water of formation and being, in said reaction product, cross-linked with the aminated phenolic resin polymer molecules at the amino groups thereof.

7. An unswelled abrasive article comprising abrasive particles bonded by a bond that comprises the reaction product of an aminated phenolic resin and a cross-linking halide resin-hardening resin-solvent agent cross-linked with the resin polymer molecules at the amino groups thereof.

8. The steps in the method of making an abrasive article which comprise making substantially non-cold-setting a potentially reactive resin bond mix and abrasive particles by utilizing therein aminated potentially reactive phenolic resin, abrasive particles, and a cross-linking resin-hardening resin-solvent agent therefor that is a halide and hence capable of substantial cross-linking, with the aminated resin polymer molecules at the amino groups thereof only under heat treatment at temperatures substantially in excess of room temperature, shaping the resultant non-cold-setting mix, and heat-treating it to effect cross-linking and hardening.

9. The steps in the method of making an abrasive article which comprise making substantially non-cold-setting a potentially reactive resin bond mix and abrasive particles by utilizing therein aminated potentially reactive phenolic resin, abrasive particles, and a cross-linking resin-hardening resin-solvent agent therefor that is a halide and hence capable of substantial cross-linking, with the aminated resin polymer molecules at the amino groups thereof only under heat treatment at temperatures substantially in excess of room temperature, cold-molding the resultant non-cold-setting mix to give it the shape of the desired abrasive article, and then heat-treating the shaped mix to effect cross-linking and hardening.

10. The steps in the method of making an abrasive article which comprise making substantially non-cold-setting and substantially non-tacky a potentially reactive resin bond mix and abrasive particles by utilizing therein aminated potentially reactive phenolic resin, abrasive particles, and a cross-linking resin-hardening resin solvent agent therefor that is a halide and hence capable of substantially cross-linking with the aminated resin polymer molecules at the amino groups thereof only under heat treatment at temperatures substantially in excess of room temperature, injecting the non-tacky and non-cold-setting plastic mix in a separable closed mold shaped to conform to the shape of the desired abrasive article, removing the shaped mass from the mold, and then heat-treating it to effect hardening.

11. The steps in the method of making an abrasive article which comprise making substantially non-cold-setting a potentially reactive resin bond mix and abrasive particles by utilizing therein aminated potentially reactive phenolic resin, abrasive particles, and a cross-linking resin hardening resin-solvent agent therefor that is a halide and hence capable of substantial cross-linking with the aminated resin polymer molecules at the amino groups thereof only under heat treatment at temperatures substantially in excess of room temperature, sheeting out the abrasive resultant non-cold-setting mix to the desired thickness and shape, and heat-treating it in sheeted and shaped form to harden it.

12. The steps in the method of making an abrasive article which comprise making substantially non-cold-setting and substantially non-tacky a potentially reactive resin bond mix and abrasive particles by utilizing therein aminated potentially reactive phenolic resin, abrasive particles, and a cross-linking resin hardening resin solvent agent therefor that is a halide and hence capable of substantially cross-linking with the aminated resin polymer molecules at the amino groups thereof only under heat treatment at temperatures substantially in excess of room temperature, working the non-tacky and non-cold-setting abrasive mix on mill rolls and sheeting it out to the desired thickness, cutting out of the resultant sheet form the desired configuration of abrasive article, and heat-treating the cut-out configuration to effect hardening.

13. The steps in the method of making an abrasive article which comprise making substantially non-cold-setting and substantially non-tacky a potentially reactive resin bond mix and abrasive particles by utilizing therein aminated potentially reactive phenolic resin and a cross-linking resin-hardening resin-solvent agent therefor that is a halide and hence capable of substantially cross-linking with the aminated resin polymer molecules at the amino groups thereof only under heat treatment at temperatures substantially in excess of room temperature, working the substantially non-tacky and non-cold-setting mix on mill rolls and adding thereto, during the working, abrasive grain, calendering the resultant abrasive mix out into substantially sheet form, cutting out of the sheet form the desired configuration of abrasive article, and heat-treating the cut-out configuration to effect hardening.

14. The steps in the method of avoiding swelling due to water of reaction formed during the making an abrasive article utilizing phenolic resin as a bond ingredient, which comprise making up a potentially reactive mix that comprises aminated potentially reactive phenolic resin and a cross-linking resin-hardening resin-solvent agent therefor that is a halide and therefore reactable with the aminated resin polymer at amino groups thereof and without formation of water by cross-linking, under heat treatment, with the aminated resin polymer molecules at the amino groups thereof, adding abrasive grain to the resultant plastic substantially non-tacky mass and mixing the abrasive particles throughout the mass, shaping the resultant abrasive mix, and heat-treating the shaped mix to react said halide agent with the resin to produce a hardened abrasive article free from detrimental swelling.

15. The steps in the method of avoiding swelling due to water of reaction formed during the making an abrasive article utilizing phenolic resin as a bond ingredient, which comprise wetting abrasive grain with a liquid halide plasticizing and resin-hardening resin-solvent agent, admixing with the wetted abrasive grain an aminated potentially reactive phenolic resin, said halide hardening and plasticizing agent being incapable of material cross-linking with the resin at ordinary temperatures and being capable of cross-linking therewith, under heat treatment and without production of water of reaction, at the amino groups of the aminated resin polymer molecules, shaping the resultant abrasive mix, and heat-treating to react said halide agent with the resin to produce a hardened abrasive article free from detrimental swelling.

16. The steps in the method of making an abrasive article which comprise making up a mix comprising aminated potentially reactive phenolic resin, abrasive grain, and a polyhalide resin-hardening resin-solvent agent incapable of material cross-linking with the resin polymer molecules at ordinary temperatures but capable of cross-linking therewith under heat treatment at the amino groups thereof to form a hardened halogenated resin, shaping the mix, and reacting the aminated phenolic resin and the polyhalide agent by heat-treating the shaped mix to effect hardening.

17. A method of avoiding substantial formation of water in the making of a phenolic-resin-bonded abrasive article comprising the steps of mixing together aminated potentially reactive phenolic resin, abrasive particles, and a resin-hardening resin-solvent agent therefor that is incapable of reacting with the resin to form water in that it is capable of cross-linking with the aminated resin polymer molecules only at the amino groups thereof, shaping the mix, and heat treating the mix to harden the bond to secure the abrasive particles and thereby form a substantially unswelled phenolic-resin-bonded abrasive article.

18. A method of avoiding substantial formation of water in the making of a phenolic-resin-bonded abrasive article comprising the steps of mixing together potentially reactive phenolic resin, abrasive particles, an aminating agent for the resin for reaction therewith to provide amino groups in the polymer molecules of the resin, and a resin-hardening resin-solvent agent that is incapable of reacting with the resultant aminated phenolic resin to form water in that it is capable of cross-linking therewith only at the amino groups in the polymer molecules of the aminated resin, shaping the mix, and heat treating the mix to harden the bond to secure the abrasive particles and thereby form a substantially unswelled phenolic-resin-bonded abrasive article.

19. An abrasive article according to claim 2 in which the halide resin-hardening resin-solvent agent is tri-glycol dichloride.

20. An abrasive article according to claim 2 in which the halide resin-hardening resin-solvent agent is di-2chlorethyl phthalate.

21. An abrasive article according to claim 2 in which the halide resin-hardening resin-solvent agent is dichlor diethyl ether.

22. An abrasive article according to claim 7 in which the cross-linking halide resin-hardening resin-solvent agent is tri-glycol dichloride.

23. An abrasive article according to claim 7 in which the cross-linking halide resin-hardening resin-solvent agent is di-2chlorethyl phthalate.

24. An abrasive article according to claim 7 in which the cross-linking halide resin-hardening resin-solvent agent is dichlor diethyl ether.

25. The method of making an abrasive article according to claim 8 in which the halide cross-linking resin-hardening resin-solvent agent is tri-glycol dichloride.

26. The method of making an abrasive article according to claim 8 in which the halide cross-linking resin-hardening resin-solvent agent is di-2chlorethyl phthalate.

27. The method of making an abrasive article according to claim 8 in which the halide cross-linking resin-hardening resin-solvent agent is dichlor diethyl ether.

28. The method of making an abrasive article according to claim 18 in which the resin-hardening resin-solvent agent is tri-glycol dichloride.

29. The method of making an abrasive article according to claim 18 in which the resin-hardening resin-solvent agent is di-2chlorethyl phthalate.

30. The method of making an abrasive article according to claim 18 in which the resin-hardening resin-solvent agent is dichlor diethyl ether.

31. The method of making an abrasive article according to claim 15 in which the liquid halide plasticizing and resin-hardening resin-solvent agent is tri-glycol dichloride.

LORING COES, JR.